United States Patent
Buegman

(12) 
(10) Patent No.: US 6,242,089 B1
(45) Date of Patent: Jun. 5, 2001

(54) PERMEATION-RESISTANT ETFE COMPOSITION AND COATINGS

(75) Inventor: Anne Buegman, Brussels (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/132,296

(22) Filed: Aug. 11, 1998

Related U.S. Application Data

(62) Division of application No. 08/693,615, filed on Aug. 7, 1996, now Pat. No. 5,849,829.
(60) Provisional application No. 60/002,046, filed on Aug. 8, 1995.

(51) Int. Cl.[7] .......................... B32B 27/08; B32B 27/20; B32B 27/32; B05D 1/06; B05D 1/38
(52) U.S. Cl. .......................... 428/339; 428/324; 428/332; 428/339; 428/421; 428/422; 428/450; 428/454; 428/458; 428/473.5; 428/474.4; 524/49; 427/458; 427/470; 427/475; 427/485; 427/486; 427/180; 427/189; 427/195; 427/202; 427/203
(58) Field of Search .................................... 428/421, 422, 428/324, 457, 332, 339, 450, 454, 458, 473.5, 474.4; 524/449; 427/458, 470, 475, 485, 486, 180, 189, 195, 202, 203

(56) References Cited

U.S. PATENT DOCUMENTS

| | | | |
|---|---|---|---|
| 4,123,602 | 10/1978 | Ukihashi et al. | 526/206 |
| 4,154,876 | 5/1979 | Segawa et al. | |
| 5,009,959 | * 4/1991 | Matsushita et al. | 428/419 |
| 5,194,336 | * 3/1993 | Yamada | 428/421 |
| 5,434,001 | * 7/1995 | Yamada et al. | 428/335 |
| 5,849,829 | * 12/1998 | Buegman | 524/449 |
| 5,985,983 | * 11/1999 | Yamada et al. | 524/520 |

FOREIGN PATENT DOCUMENTS

WO 97/06208 * 2/1997 (WO).

OTHER PUBLICATIONS

Sakurai, Yorio et al., Tack-free film-coated metal plates with good staining and chemical resistance, *Chemical Abstracts*, Abstract No. 89836, vol. 124, No. 8, Feb. 19, 1996.

Masahiro Segawa et al., Water-thinned perhaloethylene resin coating compositions, *Chemical Abstracts*, Abstract No. 141782, vol. 86, No. 20, May 16, 1977.

Masahiro Segawa et al., Fluorocarbon resin coating compositions, *Chemical Abstracts*, Abstract No. 141749, vol. 86, No. 20, May 16, 1977.

* cited by examiner

*Primary Examiner*—Vivian Chen

(57) ABSTRACT

A coated substrate comprising: (a) a substrate; (b) a primer layer containing adhesion-promoting polymer on said substrate; and (c) at least one topcoat of a permeation resistant composition of ethylene-tetrafluoroethylene (ETFE) copolymer and mica, therein the ETFE is a copolymer of about 40 to 60 mole % ethylene and about 60 to 40 mole % tetrafluoroethylene, wherein the mica is present in amounts of about 3 to about 25 wt % based on the ETFE and mica, and wherein the topcoat having a thickness of at least 150 $\mu$m. The coated substrate is formed by applying the primer to the substrate and drying, followed by dry powder coating at least one layer of ETFE and mica composition, followed by heating said layer.

8 Claims, No Drawings

PERMEATION-RESISTANT ETFE COMPOSITION AND COATINGS

This application is a divisional of application Ser. No. 08/693,615, filed Aug. 7, 1996, U.S. Pat. No. 5,849,829, which claims benefit of Provisional Patent Application Ser. No. 60/002,046, filed on Aug. 8, 1995, in the name of Anne Buegman and entitled "Permeation-Resistant ETFE Composition and Coatings"; the disclosure of which is hereby incorporated by reference.

FIELD OF THE INVENTION

The instant invention relates to a composition of ethylene-tetrafluoroethylene copolymer (ETFE) which can be used as a coating or a surface-protecting laminate on a substrate to retard permeation by water to the substrate.

BACKGROUND OF THE INVENTION

ETFE copolymers are known in the art. U.S. Pat. No. 4,123,602—Ukihashi et al. (1978) discloses such polymers with about 40 to 60 mole % of each comonomer, using modifiers such as 1% perfluoro butylethylene. Such modifiers and other adjuvants are common in the art and are considered to be part of the copolymer.

Films of various fluoropolymers including ETFE, which can have various fillers including mica, are used for cladding metal substrates in Japanese Kokai 4-229246—Sahara et al. (1992). There is no focus in this kokai on minimizing permeation or on using mica in ETFE, or on what proportions would be needed.

Mica coated with oxides to produce sparkling optical effects is the subject of U.S. Pat. No. 3,087,829—Linton (1963).

Mica is used in fluoropolymer coatings for cookware to minimize stain formation, as in U.S. Pat. No. 4,353,950—Vassiliou (1982).

The disclosure of the previously identified patents and patent publications is hereby incorporated, by reference.

SUMMARY OF THE INVENTION

The instant invention solves permeation and corrosion problems associated with conventional ETFE containing coatings by providing an additive such as mica. A mixture comprising or consisting essentially of ETFE and mica can be used effectively as a powder. The powder of ETFE and mica and be applied upon a substrate in order to provide a permeation and corrosion resistant coating.

The instant invention provides a permeation-resistant composition of matter comprising or consisting essentially of at least one fluoropolymer such as a copolymer of ethylene and tetrafluoroethylene (ETFE) and at least one additive such as mica which is either uncoated or coated with oxide, wherein the ETFE is a copolymer of about 40 to about 60 mole % of ethylene and about 60 to about 40 mole % tetrafluoroethylene, based on the copolymer, and wherein the additive is present in amounts of about 3 to about 25% by weight based on the ETFE plus mica, e.g., normally about 7.5 to about 15% by weight mica.

In one aspect, the instant invention provides coating compositions, processes and coatings that can be laminated onto a suitable substrate.

In another aspect, the instant invention relates to a dry powder coating that can be adhered to a substrate by one or more primer coatings or layers. The dry powder can be heated in order to form a substantially continuous coating or layer upon the substrate, e.g, a substrate coated with a primer.

DETAILED DESCRIPTION

While any suitable fluoropolymer can be employed in connection with the instant invention, it has been found that an ETFE based fluoropolymer and typically about 10% by weight mica in a coating gives maximum resistance to water permeation. Any suitable process can be employed for applying the fluoropolymer containing composition onto a substrate, e.g., an electrostatic-spray process for applying a powder mixture comprising ETFE and mica. Depending upon the conditions of the spraying process, some of the mica of the composition can be lost; but, under normal process conditions the resultant coating contains at least about 4 to 5% by weight mica in the coating on the coated substrate.

The coating of the instant invention can be employed in a virtually unlimited array of environments for improving the corrosion and permeation resistance of the underlying substrate, e.g., water vapor permeation resistance. Examples of such substrates include molds, tubes, chemical containers and reactors, among others. For example, for coating the inside of chemical containers or equipment vessels by rotolining, or for coating by film lamination a minimum of about 5% mica is satisfactory. More mica is generally better than less, but over a certain level such as over 25%, excess mica can degrade the mechanical integrity and properties of the coating. Normally, a mica having a platelet thickness of about 1–2 microns and an average diameter of about 10 to 130 microns is employed. If desired, one or more water or corrosion resistant additives can be employed along with mica. Additionally other additives may be used such as those that alter the properties of the coating composition or the coated substrate. For instance, various flow agents such as silica may be added to the ETFE /mica blend to improve ease of application.

The use of a coating consisting essentially of mica in ETFE in accordance with the invention retarded water penetration drastically in standard Atlas Cell tests using ASTM method C868, from 2 days with no mica, to over 2 weeks with about 10% mica.

While the previous description has focused upon a coating consisting essentially of ETFE and mica, a skilled person in this art understands that one or more fluoropolymers can be employed instead of and in conjunction with ETFE. For best results, however, the composition will contain ETFE as the predominant fluoropolymer. Suitable ETFE is available commercially and typically has an average particle size of less than about 50 microns.

The instant invention can be employed as a coating on a variety of substrates which may include a plurality of films, coatings or layers in order to obtain a composite or laminate structure. For example, one or more primer coatings or layers can be located between the substrate and ETFE/mica composition. While any suitable primer can be employed, examples of particularly useful primers include a mixture of ETFE with adhesion promoting polymers such as amide-imide polymers, polyphenylene sulfide (PPS), mixtures thereof, among others. One or more primer coatings can be prepared and applied by using any suitable conventional method. When a primer is employed, the ETFE/mica composition becomes a so-called topcoat. That is, the ETFE/ mica composition is exposed to the environment containing the corrosive or permeating species thereby protecting the underlying substrate.

The topcoat composition can be obtained by using any suitable method. One such method comprises dry blending ETFE and mica powders by using about 90% by weight TEFZEL*R* ETFE sold commercially by DuPont Company (as product code 532-6018) and about 10% platelet shaped Iriodine*R* oxide coated mica additive from Merck, Germany.

While any suitable substrate can be coated, examples of suitable substrates include steel, high carbon steel, aluminum, among others. Depending upon the characteristics desired in the coated substrate, at least one member from the group of pigments, flow agents, stablizers, among others, can be added to the ETFE/mica or primer coatings. An example of a suitable stabilizer comprises copper iodide, e.g., cuprous iodide (CuI).

The surface characteristics or substrate profile are not critical parameters for the final performance of the coating; but, surface roughening by any conventional means such grit blasting, etching, among others, can aid adhesion of the coating to the substrate. If desired, a primer coating or layer can be located between the instant coating and the substrate. While the primer does not play a critical role for the permeation resistance of the coating, the primer can enhance adhesion of the coating to the substrate thereby improving the useful life of the coating. One suitable primer is sold by the DuPont Company as product code 699-123. An example of a suitable primer composition, which was obtained from commercially available materials, is given in Table I (in weight percent).

TABLE I

Primer Composition

| | |
|---|---|
| Carbon black | 0.990 |
| Acrylic emulsion copolymer | 0.283 |
| Colloidal silica, Ludox*R* AM from DuPont | 0.876 |
| Amide imide polymer | 3.015 |
| Polyphenylene sulfide | 3.003 |
| 50:50 Ethylene-tetrafluoroethylene copolymer | 19.340 |
| 4,4'-Methyene dianiline | 0.033 |
| Hydroxypropyl cellulose | 0.091 |
| Cuprous iodide | 0.014 |
| Sodium polynaphthalene sulphonate | 0.073 |
| Octyl phenol polyether alcohol | 1.382 |
| Deionized water | 64.721 |
| Triethanol amine | 0.039 |
| N,N-Dimethylethanolamine | 0.116 |
| Heavy naphtha | 0.406 |
| N,N-Diethyl-2-amino ethanol | 0.425 |
| Triethyl amine | 0.850 |
| Furfuryl alcohol | 2.367 |
| N-Methyl-2-pyrolidone | 1.976 |

The following example is provided to illustrate not limit the scope of the invention as defined in the appended claims. In the following example, parts, percentages and proportions are by weight except where indicated otherwise.

EXAMPLE

A substrate comprising carbon steel was roughened by conventional gritblasting methods under conditions sufficient to obtain a surface roughness (Ra) of about 10 to about 15 um. The primer described above in Table 1 was applied by using conventional methods to the roughened substrate until a dry film thickness (DFT) of about 10 to about 15 microns was achieved. The primer was air-dried. ETFE was passed through a 250 micron filter. A first corrosion resistant coating consisting essentially of preblended ETFE/mica was prepared. The preblended ETFE/mica mixture was coated upon the carbon steel substrate at ambient temperature with a flat jet nozzle dry powder spray gun made by Gema Company of Switzerland (product code GEMA PG1 or PGC1 normally with a corona ring), that was operated at a spraying voltage of about 10 kv to about 30 kv. The first coating was applied with a relatively smooth flow and the coating was air dried. A thermocouple was attached to the coated substrate, which was then heated in an oven at maximum oven temperatures of about 310° C. While heating, the temperature of the substrate was measured with the thermocouple. The substrate was heated for about 20 minutes at a temperature of about 295 to about 300° C. The substrate was removed from the oven and coated while still hot using the so-called hot flocking process. This heating step causes the particles of ETFE within the coating to coalesce thereby forming a substantially continuous coating upon the substrate. The application of the ETFE/mica composition was stopped when the thermocouple temperature dropped below about 260° C. (melting temperature of ETFE). The coated substrate was then baked for 20 minutes at 295–300° C. before a subsequent coating was applied.

The substrate was coated repeatedly with the ETFE/mica composition. For best results and in order to obtain a smooth bubble-free coating of all ETFE powder-mica coating, the ETFE/mica composition is applied at about 100 to about 150 micron DFT per coat. Such a coating is visually glossy and smooth, and free of bubbles substantially throughout the thickness of the coating. The DFT of the coatings can be tailored for a wide range of applications. To achieve a relatively high DFT, ETFE/mica coatings should be applied successively as described above to the desired total DFT, typically in the range of 500 to 2,500 microns in thickness. Normally, the last or final coating (also known as the top-coat) is heated for a period of about 30 to 45 minutes at a temperature of about 295 to 300° C.

The water vapor resistance of the previously described coated substrate was tested in a conventional Atlas Cell. Coated substrates were exposed to the liquid-gas interface of a solution media of pure deionized water and/or acid at a low concentration, hydrochloric acid specifically 0.05M HCl in deionized water, at the boiling temperature until the coating shows blistering failure. When the water permeates through the coating and contacts the substrate, blisters can form. Tests were conducted using DFTs of 400–500 microns. Under these conditions the blistering resistance was more than 4 weeks for both liquids. Other experiments were conducted and showed that if the coating is applied at a minimum DFT of 150 microns the same water vapor resistances are obtained. These results are also useful for molds and chemical processing industry equipment. The system without mica addition shows very poor water vapor resistance.

The following Table 2, illustrates the blister formation time as a function of weight percent mica and DFT.

TABLE 2

| % Mica | Time(hours) | DFT(microns) |
|---|---|---|
| 0 | 72 | 398 |
| 5 | <336 | 398 |
| 7.5 | <336 | 356 |
| 10 | >720 | 439 |

Table 2 illustrates that the presence of mica provides improved water vapor resistance to permeation, e.g., without mica blistering occurs after 3 days exposure. Table 2 also illustrates that a substrate coated with a first layer comprising a primer and a second layer of ETFE/mica achieves desirable water vapor resistance properties. While the ETFE/nica coating can be tailored for a variety of environments, for best results the coating is applied at a minimum DFT of 150 microns.

The following is claimed:

1. A coated substrate comprising
   (a) a primer comprising one or more adhesion promoting polymers,
   (b) at least one topcoat of a permeation resistant composition of copolymer of ethylene and tetrafluoroethylene (ETFE) and mica, wherein the ETFE is a copolymer of about 40 to about 60 mole % ethylene and about 40 to about 60 mole % tetrafluoroethylene, based on the copolymer, wherein the mica is present in amounts of about 3 to about 25% by weight based on the ETFE plus mica, and
   (c) a substrate on which said primer is coated, said composition being applied to said primer as a dry powder, said topcoat being at least 150 microns thick.

2. The coated substrate of claim 1 where the adhesion promoting polymers comprise a mixture of amide imide polymer and polyphenylene sulfide.

3. The coated substrate of claim 1 wherein said substrate comprises at least one member selected from the group consisting of aluminum, carbon steel and steel.

4. The coated substrate of claim 1 wherein said topcoat is about 500 to about 2500 microns thick.

5. A process of coating a substrate with a permeation resistant composition, the process comprising the steps of:
   coating the substrate with at least one primer comprising ETFE,
   drying the primed substrate,
   dry powder coating at least one layer comprising ETFE and mica onto the primed substrate,
   heating the layer to a temperature of at least about 295 C. under conditions sufficient to melt the layer, wherein the total thickness of the layers applied to the substrate range of about 500 to about 2,500 microns in thickness.

6. The process of claim 5 in which the heating after each application is done for at yeast about 20 minutes.

7. The process of claim 5 wherein said at least one layer comprising ETFE and mica is applied by an electrostatic spray process upon the primed substrate which is at temperature in the range of about 260 to about 310° C.

8. A coated substrate produced by the process of claim 5.

* * * * *

UNITED STATES PATENT AND TRADEMARK OFFICE
CERTIFICATE OF CORRECTION

PATENT NO. : 6,242,089 B1
DATED : June 5, 2001
INVENTOR(S) : Anne Buegman

It is certified that error appears in the above-identified patent and that said Letters Patent is hereby corrected as shown below:

Claim 5,
Line 12, change "295C" to -- 295°C --.

Claim 6,
Line 17, change "yeast" to -- least --.

Add the following claim:
-- 9. The process of claim 7 wherein at least three layers comprising ETFE and mica are applied upon the primed substrate. --

Signed and Sealed this

Twenty-sixth Day of March, 2002

Attest:

JAMES E. ROGAN
Attesting Officer     Director of the United States Patent and Trademark Office